United States Patent

Kuroda et al.

Patent Number: 5,422,326
Date of Patent: * Jun. 6, 1995

[54] PROCESS FOR PREPARING A CATALYST FOR PRODUCING METHACRYLIC ACID

[75] Inventors: Toru Kuroda; Motomu Ohkita, both of Otake, Japan

[73] Assignee: Mitsubishi Rayon Co., Ltd., Tokyo, Japan

[ * ] Notice: The portion of the term of this patent subsequent to Oct. 5, 2010 has been disclaimed.

[21] Appl. No.: 978,698

[22] PCT Filed: Jun. 11, 1992

[86] PCT No.: PCT/JP92/00747

§ 371 Date: Feb. 8, 1993

§ 102(e) Date: Feb. 8, 1993

[87] PCT Pub. No.: WO92/22378

PCT Pub. Date: Dec. 23, 1992

[30] Foreign Application Priority Data

Jun. 12, 1991 [JP] Japan .................. 3-140120

[51] Int. Cl.$^6$ ............................. B01J 31/00
[52] U.S. Cl. .................. 502/159; 502/200; 502/205; 502/206; 502/209
[58] Field of Search ............. 502/200, 205, 206, 209, 502/159

[56] References Cited

U.S. PATENT DOCUMENTS 4,092,269 5/1978 Mount et al.
4,966,877 10/1990 Langerbeins et al. ............ 502/209
5,250,485 10/1993 Kuroda et al. .................. 502/159

FOREIGN PATENT DOCUMENTS

| | | |
|---|---|---|
| 0006248 | 1/1980 | European Pat. Off. |
| 0237240 | 9/1987 | European Pat. Off. |
| 0284947 | 5/1988 | European Pat. Off. |
| 55-73347 | 6/1980 | Japan . |
| 58-3644 | 1/1983 | Japan . |
| 60-239439 | 11/1985 | Japan . |
| 63-256137 | 10/1988 | Japan . |
| 63-315148 | 12/1988 | Japan . |
| 1331423 | 9/1973 | United Kingdom . |

OTHER PUBLICATIONS

European Search Report dated Aug. 20, 1993.

*Primary Examiner*—Asok Pal
*Assistant Examiner*—E. D. Irzinski
*Attorney, Agent, or Firm*—Armstrong, Westerman, Hattori, McLeland & Naughton

[57] ABSTRACT

When a catalyst for producing methacrylic acid is prepared by shaping a catalyst component represented by the general formula $P_aMo_bV_cX_dY_eZ_fO_g$ wherein P, Mo, V, X, Y, Z, a, b, c, d, e, f and g are as defined in the specification, a catalyst capable of giving methacrylic acid in high yield is provided by adding one or more organic high-molecular weight compounds with an average particle size of 0.01–10 μm, and carrying out heat treatment before use as a catalyst.

1 Claim, No Drawings

PROCESS FOR PREPARING A CATALYST FOR PRODUCING METHACRYLIC ACID

TECHNICAL FIELD

The present invention relates to a process for preparing a catalyst used for producing methacrylic acid by vapor phase catalytic oxidation of methacrolein.

BACKGROUND ART

There have been made a large number of proposals on processes and catalysts for producing methacrylic acid by vapor phase catalytic oxidation of methacrolein. In one of these proposals, there has been disclosed a process using an organic substance such as a cellulose, a polyvinyl alcohol or the like in preparation of a catalyst, for the purpose of controlling pores (the specification of British Patent Laid-Open Application No. 2037604). As an invention for controlling pores, there is the invention disclosed in Japanese Patent Unexamined Publication No. 60-239439. These catalysts, however, have defects such as unsatisfactory reaction results, a large decrease of catalytic activity with the lapse of time, and a troublesome after-treatment, and there is a desire to seek further improvement in them for their employment as industrial catalysts.

DISCLOSURE OF THE INVENTION

The present invention is intended to provide a novel process for preparing a catalyst for advantageous production of methacrylic acid from methacrolein.

The present inventors earnestly investigated in order to improve conventional catalyst preparation processes, and consequently found a novel process for preparing a catalyst which gives mothacrylic acid in a higher yield than does that prepared by a conventional process. The present invention is a process for preparing a catalyst for producing methacrylic acid by vapor phase catalytic oxidation of methacroiein with molecular oxygen which catalyst is obtained by adding an organic high-molecular weight compound with an average particle size of 0.01 μm to 10 μm to a catalyst component having a composition represented by the conoral formula:

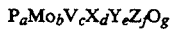

(wherein P, Mo, V and O denote phosphorus, molybdenum, vanadium and oxygen, respectively; X denotes at least one element selected from the group consisting of arsenic, antimony, bismuth, germanium, zirconium, tellurium, silver and boron; Y denotes at least one element selected from the group consisting of iron, copper, zinc, chromium, magnesium, tantalum, manganese, barium, gallium, cerium and lanthanum; Z denotes at least one element selected from the group consisting of potassium, rubidium, cesium and thallium; a, b, c, d, e and f denotes atomic ratio values for the individual elements: in the case of b being 12, a=0.5 to 3, c=0.01 to 3, d=0 to 3, e=0 to 3, f=0.01 to 3; and g is a number of oxygen atoms which is necessary for giving the above valences of the individual constituents) to obtain a mixture, and molding the resulting mixture, followed by heat treatment.

BEST MODE FOR CARRYING OUT THE INVENTION

In the present invention, it is important that at the time of the molding of the catalyst, the organic high-molecular weight compound with an average particle size in a specified range of 0.01 μm to 10 μm has been previously added to the catalyst components. When the average particle size of the organic high-molecular weight compound is less than 0.01 μm, there are caused problems in handling, for example, secondary aggregation of particles of the organic high-molecular weight compound used occurs, and dust tends to be raised during handling of the organic high-molecular weight compound. When the average particle size is more than 10 μm, the proportion of pores preferable for the reaction in the catalyst obtained by the heat treatment after the molding is decreased, so that the catalytic capability is deteriorated.

Although the effect of the addition of the organic high-molecular weight compound with the above specified average particle size on the improvement of the catalytic capability is not exactly clear, it can be speculated from the increase of pores with a diameter of approximately 100–10,000 Å in the catalyst by the heat treatment (200°–500° C.) carried out after the molding into the catalyst that a pore structure ideal for the oxidation reaction for production of methacrylic acid from methacrolein is formed in the catalyst by the addition of the organic high-molecular weight compound.

The particle size of the organic high-molecular weight compound was measured under a scanning electron microscope, and the diameter of pores in the catalyst was measured by a mercury penetrating method.

In the present invention, although the organic high-molecular weight compound incorporated into the catalyst is not critical so long as it has an average article size in the above range, those which are easily removable by decomposition by heating or combustion, for example, polymers of methyl, ethyl, propyl, butyl or isobutyl esters of (meth)acrylic acid, and polymers of styrene, α-methylstyrene or the like, are preferable. In particular, those which decompose into a monomer at a relatively low temperature to vaporize and evaporate, for example, polymethyl methacrylates and polystyrenes, are preferable. These compounds may be used singly or as a mixture of two or more thereof.

The adding amount of the organic high-molecular weight compound is suitably 0.1 to 30% by weight based on the weight of the catalyst. When the adding amount is too small, the addition has no effect. When the adding amount is too large, the mechanical strength of the catalyst after the heat treatment is lowered. Therefore, both of such amounts are not desirable.

A process for producing a catalyst having the composition employed in the present invention is not critical. Various heretofore well-known methods such as an evaporation-to-dryness method, precipitation method, oxide-mixing method, etc. can be used unless a markedly uneven distribution of the constituents occurs. The organic high-molecular weight compound is added in wet or dry state to a powdery catalyst component obtained by such a method, after which the resulting mixture is molded into a catalyst of a desired shape by supporting the same on a carrier or tableting the same. The organic high-molecular weight compound can be removed by heat-treating the catalyst obtained by the molding, at 200°–500° C., preferably 300°–450° C.

As starting materials for the catalyst component having a composition represented by the above general formula $P_aMo_bV_cX_dY_eZ_fO_x$, oxides, nitrates, carbonates, ammonium salts, halides, etc. of the individual elements can be used in combination. For example, as a material for molybdenum, there can be used ammonium paramolybdate, molybdenum trioxide, molybdenum chloride, etc. As a material for vanadium, there can be used ammnonium metavanadate, vanadium pentaoxide, vanadium chloride, etc.

Although the catalyst used in the process of the present invention may be free from a carrier, it may be used after being supported on an inert carrier of silica, alumina, silica-alumina, magnesia, titania, silicon carbide or the like, or after being diluted with the inert carrier.

When the catalyst obtained according to the present invention is utilized, the concentration of methacrolein in a starting gas can be varied in a wide range, though it is suitably 1 to 20% by volume, particularly preferably 3 to 10% by volume. The starting methacrolein may contain a small amount of impurities such as water, lower saturated aldehydes, etc., and these impurities have no substantial influence on the reaction.

Although employment of air as an oxygen source for carrying out the catalytic oxidation is economical, air enriched with pure oxygen may also be used if necessary. The oxygen concentration in the starting gas is defined as the molar ratio of oxygen to methacrolein, and the value of the ratio is preferably 0.3 to 4, in particular, 0.4 to 2.5. The starting gas may be diluted with an inert gas such as nitrogen, water vapor, or carbon dioxide gas.

The reaction pressure is preferably atomospheric pressure to several atmospheres. Although the reaction temperature can be chosen in the range of 230°–450° C. it is particularly preferably 250°–400° C. The reaction can be carried out either on a fixed bed or on a fluidized bed.

EXAMPLES

The process for preparing the catalyst according to the present invention and examples of reaction using said catalyst are concretely explained below.

In the examples and comparative examples, the conversion of methacrolein and the selectivity of methacrylic acid produced are defined by the following:

Conversion of methacrolein (%) =

$$\frac{\text{Number of moles of methacrolein reacted}}{\text{Number of moles of methacrolein fed}} \times 100$$

Selectivity of methacrylic acid (%) =

$$\frac{\text{Number of moles of methacrylic acid produced}}{\text{Number of moles of methacrolein reacted}} \times 100$$

Parts in the following examples and comparative examples are by weight, and the analysis was carried out by a gas chromatography.

Example 1

In 300 parts of pure water were dissolved 100 parts of ammonium paramolybdate, 1.66 parts of ammonium metavanadate and 4.77 parts of potassium nitrate. A solution of 8.16 parts of 85% phosphoric acid in 10 parts of pure water was added thereto, and then 2.75 parts of antimony trioxide was added, after which the resulting mixture was heated to 95° C. with stirring. Subsequently, a solution of 1.14 parts of copper nitrate in 30 parts of pure water was added, and the resulting mixture was evaporated to dryness with heating and stirring.

The solid thus obtained was dried at 130° C. for 16 hours, and then a polymethyl methacrylate (hereinafter abbreviated as PMMA) with an average particle size of 0.15 μm was added in an amount of 3 parts per 100 parts of the dried solid and mixed therewith, after which the resulting mixture was molded under pressure molded and heat-treated at 380° C. for 5 hours while introducing air. This product was used as a catalyst.

The composition determined for elements other than oxygen (hereinafter the same applied) of the catalyst obtained was $P_{1.5}Mo_{12}V_{0.3}Sb_{0.4}Cu_{0.1}K_1$.

This catalyst was packed into a reaction tube, and a mixed gas consisting of 5% of methacrolein, 10% of oxygen, 30% of water vapor and 55% of nitrogen (% by volume) was introduced thereinto at a reaction temperature of 270° C. for a contact time of 3.6 seconds. The product was collected and then analyzed by a gas chromatography to find that the conversion of methacrolein was 80.3% and the selectivity of methacrylic acid 81.4%.

Comparative Example 1

When a catalyst for comparison $P_{1.5}Mo_{12}V_{0.3}Sb_{0.4}Cu_{0.1}K_1$ was prepared according to Example 1, except that PMMA was not added at the time of the molding under pressure, and the reaction was carried out under the same reaction conditions as in Example 1 by the use of this catalyst, the conversion of methacrolein was 80.6% and the selectivity of methacrylic acid 79.7%.

Comparative Example 2

When a catalyst for comparison $P_{1.5}Mo_{12}V_{0.3}Sb_{0.4}Cu_{0.1}K_1$ was prepared according to Example 1, except that the average particle size of PMMA added at the time of molding under pressure was 20 μm, and the reaction was carried out under the same conditions as in Example 1 by the use of this catalyst, the conversion of methacrolein was 80.4% and the selectivity of methacrylic acid 79.3%. These results are equal to or somewhat inferior to those obtained when PMMA was not added at all, indicating that the average particle size of a substance added is of important significance.

Example 2

With 800 parts of pure water were mixed 100 parts of molybdenum trioxide, 2.63 parts of vanadium pentaoxide and 6.67 parts of 85% phosphoric acid. The resulting mixture was stirred with heating under reflux for 3 hours, after which 0.92 parts of copper oxide was added, and heating with stirring under reflux was conducted again for 2 hours. The resulting slurry was cooled to 50° C. and a solution of 8.98 parts of cesium hydrogencarbonate in 30 parts of pure water was added and then stirred for 15 minutes. Then, a solution of 10 parts of ammonium nitrate in 30 parts of pure water was added, and the resulting mixture was evaporated to dryness with heating at 100° C. and stirring.

The solid obtained was dried at 130° C. for 16 hours, after which a polystyrene with an average particle size of 5 μm was added in an amount of 3 parts per 100 parts of the dried solid and mixed therewith, and the resulting mixture was molded under pressure and heat-treated at 380° C. for 3 hours while introducing air. This product was used as a catalyst.

The composition of the catalyst was $P_1Mo_{12}V_{0.5}Cu_{0.2}Cs_{0.8}$.

When the reaction was carried out by the use of this catalyst under the same reaction conditions as in Example 1 except for changing the reaction temperature to 285° C., the conversion of methacrolein was 84.9% and the selectivity of methacrylic acid 85.7%.

Comparative Example 3

When a catalyst for comparison $P_1Mo_{12}V_{0.5}Cu_{0.2}Cs_{0.8}$ was prepared according to Example 2, except that no polystyrene was added at the time of the molding under pressure, and the reaction was carried out under the same reaction conditions as in Example 2 by the use of this catalyst, the conversion of methacrolein was 85.3% and the selectivity of methacrylic acid 84.2%.

Comparative Example 4

When a catalyst for comparison $P_1Mo_{12}V_{0.5}Cu_{0.2}Cs_{0.8}$ was prepared according to Example 2, except that the average particle size of a polystyrene added at the time of the molding under pressure was 50 μm, and the reaction was carried out under the same reaction conditions as in Example 2 by the use of this catalyst, the conversion of methacrolein was 85.0% and the selectivity of methacrylic acid 83.8%.

Examples 3 to 11

The catalysts listed in Table 1 were prepared according to Example 1, and the reaction was carried out under the same conditions as in Example 1 except for the reaction temperature to obtain the results shown in Table 1.

COMPARATIVE EXAMPLES 5 TO 13

The catalysts for comparison listed in Table 1 were prepared according to Examples 3 to 11, except that no organic high-molecular weight compound was added at the time of the molding under pressure, and the reaction was carried out under the same conditions as in Examples 3 to 11 to obtain the results shown in Table 1.

Comparative Examples 14 TO 22

The catalysts for comparison listed in Table 1 were prepared according to Examples 3 to 11, except that as organic high-molecular weight compound added at the time of the molding under pressure, one or more compounds having an average particle size of 10 μm or more were used, and the reaction was carried out under the same conditions as in Examples 3 to 11 to obtain the results shown in Table 1.

TABLE 1

| | Composition of catalyst | Organic high-molecular weight compound added [average particle size (μm)/adding amount (wt %)] | Reaction temperature (°C.) | Conversion of methacrolein (%) | Selectivity of methacrylic acid (%) |
|---|---|---|---|---|---|
| Example 3 | $P_1Mo_{12}V_{0.5}Sb_{0.7}Bi_{0.2}Zn_{0.2}Ge_{0.2}La_{0.3}K_1$ | PMMA [0.15/5] | 270 | 89.9 | 88.7 |
| Comparative Example 5 | " | No addition | " | 89.6 | 87.5 |
| Comparative Example 14 | " | PMMA [100/5] | " | 89.4 | 87.0 |
| Example 4 | $P_{1.5}Mo_{12}V_{0.8}Te_{0.2}Cu_{0.1}Mg_{0.3}Fe_{0.2}Rb_1$ | PMMA [0.25/3] | 290 | 87.5 | 88.5 |
| Comparative Example 6 | " | No addition | " | 87.3 | 87.6 |
| Comparative Example 15 | " | PMMA [20/3] | " | 87.2 | 86.1 |
| Example 5 | $P_{1.3}Mo_{12}V_{0.4}Sb_{0.8}Bi_{0.2}Cu_{0.1}Ba_{0.2}Tl_{0.8}$ | PMMA [0.25/4] | 290 | 87.1 | 88.5 |
| Comparative Example 7 | " | No addition | " | 86.6 | 87.6 |
| Comparative Example 16 | " | PMMA [50/4] | " | 86.2 | 87.1 |
| Example 6 | $P_{1.4}Mo_{12}V_{0.4}Ge_{0.2}B_{0.2}Cu_{0.1}Fe_{0.3}K_{0.3}Rb_{0.8}$ | PMMA [0.40/2] | 290 | 88.0 | 87.5 |
| Comparative Example 8 | " | No addition | " | 88.2 | 86.0 |
| Comparative Example 17 | " | PMMA [100/2] | " | 88.0 | 85.7 |
| Example 7 | $P_{1.2}Mo_{12}V_{0.5}Ag_{0.1}Ta_{0.2}Cu_{0.2}Cs_1$ | PMMA [0.80/3] | 290 | 82.1 | 87.0 |
| Comparative Example 9 | " | No addition | " | 83.2 | 85.2 |
| Comparative Example 18 | " | PMMA [20/3] | " | 82.6 | 84.3 |
| Example 8 | $P_2Mo_{12}V_{0.5}Zr_{0.4}Cu_{0.2}Cr_{0.5}Tl_{0.8}$ | PMMA [2.0/3] | 290 | 87.8 | 86.7 |
| Comparative Example 10 | " | No addition | " | 87.8 | 85.5 |
| Comparative Example 19 | " | PMMA [50/3] | " | 87.5 | 85.0 |
| Example 9 | $P_{1.5}Mo_{12}V_{0.3}Ag_{0.1}Ge_{0.3}Cu_{0.2}Ba_{0.2}Mn_{0.05}Cs_1$ | Polystyrene [2.0/5] | 290 | 86.6 | 88.0 |
| Comparative Example 11 | " | No addition | " | 86.3 | 87.0 |
| Comparative Example 20 | " | PMMA [100/5] | " | 86.0 | 86.2 |
| Example 10 | $P_{1.5}Mo_{12}V_{0.5}As_{0.2}Cu_{0.2}K_{0.7}Cs_{0.2}$ | PMMA [2.0/3] + Polystyrene [5.0/2] | 310 | 82.9 | 86.9 |
| Comparative Example 12 | " | No addition | " | 83.0 | 85.7 |
| Comparative Example 21 | " | PMMA [100/3] + Polystyrene [50/2] | " | 82.5 | 85.3 |
| Example 11 | $P_{1.5}Mo_{12}V_{0.7}Sb_{0.7}Ga_{0.2}B_{0.2}Cu_{0.2}Zn_{0.3}Ge_{0.1}K_1$ | Poly(isobutyl methacrylate) [5.0/3] | 290 | 89.2 | 87.4 |
| Comparative Example 13 | " | No addition | " | 88.8 | 86.6 |

TABLE 1-continued

| Composition of catalyst | Organic high-molecular weight compound added [average particle size (μm)/adding amount (wt %)] | Reaction temperature (°C.) | Conversion of methacrolein (%) | Selectivity of methacrylic acid (%) |
|---|---|---|---|---|
| Comparative Example 22 " | Poly(isobutyl methacrylate) [100/3] | " | 88.3 | 86.0 |

INDUSTRIAL APPLICABILITY

A catalyst prepared by the process of the present invention has a pore structure preferable for vapor phase catalytic oxidation reaction of methacrolein, and has the effect of improving the selectivity of methacrylic acid.

We claim:

1. A process for preparing a catalyst for producing methacrylic acid by vapor phase catalytic oxidation of methacrolein, comprising adding one or more organic high-molecular weight compounds selected from the group consisting of polymethyl methacrylates and polystyrenes, the compounds having an average particle size of 0.02 μm to 10 μm, to a catalyst component having a composition represented by the general formula:

$P_a Mo_b V_c X_d Y_e Z_f O_g$ (wherein P, Mo, V and O denote phosphorus, molybdenum, vanadium and oxygen, respectively; X denotes at least one element selected from the group consisting of arsenic, antimony, bismuth, germanium, zirconium, tellurium, silver and boron; Y denotes at least one element selected from the group consisting of iron, copper, zinc, chromium, magnesium, tantalum, manganese, barium, gallium, cerium and lanthanum; Z denotes at least one element selected from the group consisting of potassium, rubidium, cesium and thallium; a, b, c, d, e and f note atomic ratio values for the individual elements: in the case of b being 12, a=0.5 to 3, c=0.01 to 3, d=0. to 3, e=0 to 3, f=0.01 to 3; and g is a number of oxygen atoms which is necessary for giving the above valences of the individual constituents) to obtain a mixture, and molding the resulting mixture, followed by a heat treatment to remove the one or more organic high molecular weight compounds.

* * * * *